Feb. 13, 1940.  A. M. M. SALDUCCO  2,190,571
LICENSE TAG COVER
Filed March 16, 1939
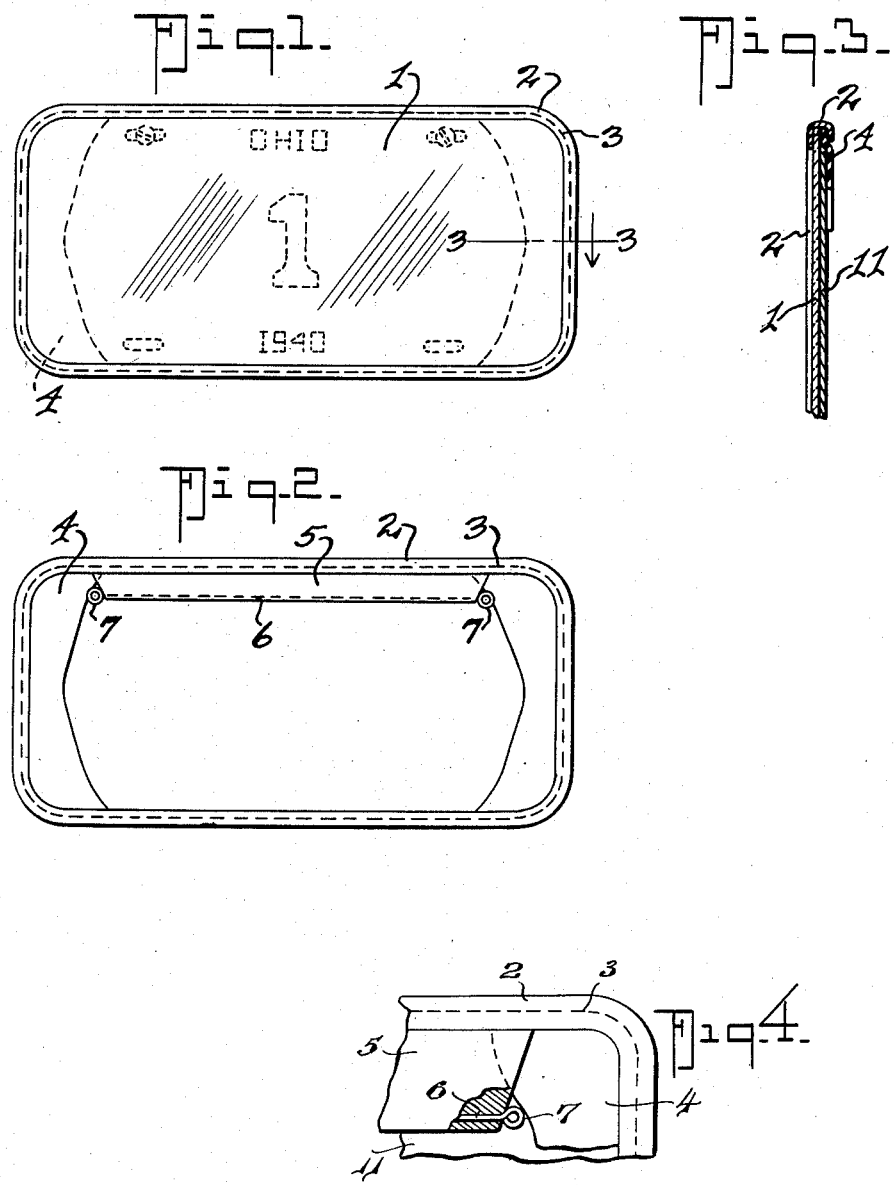
Inventor
A.M. MARIO SALDUCCO
By Dieterich & Rutley
Attorneys Patented Feb. 13, 1940

2,190,571

UNITED STATES PATENT OFFICE 2,190,571

LICENSE TAG COVER

Angelo Michele Mario Salducco, Troy, N. Y.

Application March 16, 1939, Serial No. 262,258

4 Claims. (Cl. 40—125)

My invention relates to an improved license plate protector which may be quickly applied to a license tag without the use of nuts and bolts or similar fasteners.

Primarily my invention has for an object to provide a license plate protector having a transparent non-breakable front and elastic pockets in the rear which slip over the plate and hold the cover in place.

Further it is an object of my invention to provide a cover which will not only protect the license plate but will also protect the car from being scratched by the plates while the plates are being secured thereto.

Further it is an object to provide, as a modification, a license plate cover having a flap on the rear side which covers the plate attaching means from the elements, and prevents water seeping in between the plate and the transparent front.

Further it is an object of my invention to provide, as a modification, an envelope type of cover which is secured to the plate by a slide fastener (Fig. 4).

My invention is particularly suitable for use in garages or places where the license tags of a dealer are constantly being used on different cars, frequently new cars. In such cases it is very easy to place my cover on the tags thus preventing the scratching of the car when the tags are being hastily secured thereto.

Another feature of my cover is its simple construction and economy of manufacture.

Other objects will in part be obvious and in part be pointed out hereinafter.

To the attainment of the aforesaid objects and ends the invention still further resides in the novel details of construction, combination and arrangement of parts, all of which will first be fully described in the following detailed description, and then be particularly pointed out in the appended claims, reference being had to the accompanying drawing, in which:

Fig. 1 is a front elevation of my invention in use.

Fig. 2 is a rear elevation of the device showing a rain flap as a modification.

Fig. 3 is a detail cross-section on the line 3—3 of Fig. 1.

Fig. 4 is an enlarged detail of the flap shown in Fig. 2 with part of the flap broken away to show the construction.

In the drawing in which like numerals of reference designate like parts in all of the figures, 1 indicates a transparent window bound as at 2 by (preferably waterproof) fabric or similar material stitched to the window as at 3.

4 represents elastic flaps or pockets which fit over the ends of the license tag to hold the cover securely in place.

A rain shield 5 may be provided with a wire 6 passing through its bottom edge and being looped as at 7 to pass over the bolts holding the license tag to its bracket.

The numeral 11 indicates an ordinary license tag.

It will be obvious from the description and drawing as to how the device is used. The form shown in Fig. 1 is applied by merely stretching the elastic pockets 4 over the ends of the plate and releasing them to snap into place.

When using the type shown in Fig. 2 the bolts for securing the tag to the bracket which supports it are first inserted in the slots in the tag, after which the cover is applied and the looped ends of the wire 6 in the flap 5 are placed over the bolts before the nuts are screwed on.

What I claim is:

1. A license plate protector comprising a flexible marginal frame, a transparent sheet secured at its margins to said frame and elastic flaps secured at their tops, bottoms and one side of each to said frame adjacent the ends of the frame and passing over a portion of its back for mounting the protector on a license plate.

2. A license plate protector comprising a flexible marginal frame, a transparent sheet secured at its margins to said frame and means connected to said frame and passing over at least a portion of its back for mounting the protector on a license plate, said means comprising elastic pockets at the ends of the frame.

3. A license plate protector comprising a flexible marginal frame, a transparent sheet secured at its margins to said frame and means connected to said frame and passing over at least a portion of its back for mounting the protector on a license plate, said means comprising elastic pockets at the ends of the frame and a rain shedding flap secured to the top of the frame between the end pockets and means for securing the flap in place.

4. A license plate protector comprising a flexible marginal frame, a transparent sheet secured at its margins to said frame and means connected to said frame and passing over at least a portion of its back for mounting the protector on a license plate, said means comprising resilient pockets and a rain shedding flap secured to the top of the frame between the end pockets and means for securing the flap in place, said last named means comprising a wire along the free edge of the flap and terminating in bolt engaging loops.

A. M. MARIO SALDUCCO.